United States Patent [19]
Jackson

[11] Patent Number: 6,085,460
[45] Date of Patent: Jul. 11, 2000

[54] SYSTEM FOR HOLDING PLANT CONTAINERS

[76] Inventor: Bryan Jackson, 810 Springvale Road, Keysborough, Victoria 3173, Australia

[21] Appl. No.: 09/089,868

[22] Filed: Jun. 3, 1998

[51] Int. Cl.$^7$ .............................. A01G 9/02; A47G 7/02
[52] U.S. Cl. .............................. 47/65.5; 47/66.5; 47/66.6
[58] Field of Search .................................. 47/18, 71, 73, 47/39, 65.5, 66.5, 66.7, 70, 66.6

[56] References Cited

U.S. PATENT DOCUMENTS

| | | | |
|---|---|---|---|
| 3,542,210 | 11/1970 | Sorensen | 47/39 X |
| 4,173,097 | 11/1979 | Staby . | |
| 5,022,183 | 6/1991 | Bohlmann | 47/71 X |
| 5,269,095 | 12/1993 | Helfman et al. . | |
| 5,327,679 | 7/1994 | Hawthorne | 47/73 |
| 5,481,825 | 1/1996 | Aoyama . | |
| 5,481,826 | 1/1996 | Dickinson et al. . | |
| 5,570,540 | 11/1996 | Womack et al. | 47/39 |

FOREIGN PATENT DOCUMENTS

| | | | |
|---|---|---|---|
| 46100/97 | 6/1998 | Australia . | |
| 2263052 | 7/1993 | United Kingdom | 47/66.6 |

*Primary Examiner*—Peter M. Poon
*Assistant Examiner*—Jeffrey L Gellner
*Attorney, Agent, or Firm*—Lerner, David, Littenberg, Krumholz & Mentlik, LLP

[57] ABSTRACT

The invention comprises a system for holding plant containers while allowing access to the bottoms of the plant containers for watering purposes. The system includes support 1 having an array of support members 2. The system further comprises a plurality of plant containers 3, each container having in its bottom surface 4 indentations 5 complementary to support members 2 of support The configuration of support 1 and bottom surface indentations 5 on plant containers 3 is such that, when a plant container 3 is placed on support 1 in an appropriate orientation (herein described as a "retention position", and shown at the bottom left hand corner of FIG. 1), support members 1 engage with the container's bottom surface indentations 5 to provide the plant container with some stability against falling over.

4 Claims, 7 Drawing Sheets

SYSTEM FOR HOLDING PLANT CONTAINERS

FIELD OF THE INVENTION

This invention relates to a system for holding plant containers, as well as to a plant container and a support for plant containers. It relates particularly but not exclusively to a system for holding plant containers while allowing access to the bottoms of the plant containers for watering purposes, as well as to plant containers and supports suitable for use in such a system.

BACKGROUND OF THE INVENTION

The system of the present invention is particularly suitable for use with capillary watering systems and systems of the type described in my copending Australian Provisional Patent Application PO 3891 entitled "Liquid supply apparatus and process" filed on Nov. 29, 1996, the contents of which are hereby incorporated herein by reference.

Numerous different types of plants are grown, stored, transported and distributed in plant containers arranged in trays. Although the eventual purchaser may purchase only one or a small number of plants in the plant containers, the growing, storing and distributing of large quantities of identical plants in this manner enables the plant grower to take advantage of economies of scale. The plant containers used may be circular or approximately square or rectangular in shape, allowing for efficient packing on trays.

If the trays are of a size which accommodates exactly a predetermined number of plant containers, the plant containers can be held in place in a relatively stable manner, abutting up against each other, and making it unlikely that the plant containers will be knocked or blown over. However, there is sometimes a requirement to hold plant containers of different sizes on the same tray, and sometimes the space taken up by the plant containers on the tray does not exactly match the available space on the tray. As plants grow, it is frequently necessary to provide greater spacing between them. This is typically done by removing every second plant container from the tray. However, this, and each other type of spacing irregularity, means that each plant container is no longer supported by abutment against its neighbouring containers, with the result that the plant containers can, and frequently do, get knocked over by wind or movement.

One type of system which avoids problems associated with individual plant containers falling over consists of a specially shaped vacuum formed holder with individual compartments for individual plant containers. These vacuum formed container trays are sometimes referred to as "scuttle trays", and consist of a structure with several spaced-apart well-shaped indentations. Each well-shaped indentation corresponds with the shape of a plant container which is inserted into it. An advantage of these vacuum formed trays is that they allow precise relative positioning of plants and automated treatment processes such as soil filling, planting and watering. However, a vacuum formed tray of this sort is in general suitable only for particular types of plants, as the spacing between individual plant containers is fixed by the configuration of the tray structure. Moreover, the vacuum formed tray is suitable in general terms only for smaller types of plant containers.

Another type of plant holder is a rack provided for plant containers placed on capillary matting or sand beds. A sand bed is a method for automatically watering plants in containers. The sand bed is filled to the top of the level of the sand with water, and plant containers with holes in or near their bottoms are placed on the sand, so that water can filter up through the soil in the plant containers to the plants.

A typical rack holding system for plant containers on sand beds consists of a lattice-like framework oriented horizontally and held several centimetres above the level of the sand bed by means of legs. Each of the holes in the lattice bed accommodates snugly a plant container, so that the bottom of the plant container touches the sand bed and the sides of the plant container are held against falling over by the lattice. However, the lattice arrangement does not allow for variable spacing between plant containers. A plant container can be placed in every lattice hole, but this may result in plants being too close together as they grow up. To create more space for each plant container, every second container can be removed; however, this may result in inefficient use of area if the necessary separation between adjacent plants is not a full container width.

SUMMARY OF THE INVENTION

According to one aspect of the present invention, there is provided a system for holding plant containers while allowing access to the bottoms of the plant containers for watering purposes, including:

(a) a support having an array of support members;
(b) a plurality of plant containers, each container having in its bottom surface indentations complementary to support members of the support;

wherein configuration of the support and the bottom surface indentations on the plant containers is such that:

(i) when a plant container is placed on the support in an appropriate orientation (hereafter described as a "retention position"), support members engage with the container's bottom surface indentations to provide the plant container with some stability against falling over;

(ii) when a plant container is placed on the support in a retention position, the lowest parts of the container protrude below or almost below the support members, enabling water from below the support members to enter the plant container through one or more holes in or near the bottom surface of the container; and (iii) there are a number of different retention positions for plant containers, enabling the spacing between containers on the support to be varied.

The number of retention positions provided by the array of support members may be any suitable number. It is preferred that the number of retention positions be greater than the total number of containers which can be accommodated simultaneously by the support. It is especially preferred that the support members be spaced regularly with a separation of approximately one third of a lineal dimension of a typical plant container which is to be used with the support, thereby allowing the spacing distance between adjacent plant containers to be approximately a multiple of a third of a lineal dimension of the containers.

The support and the array of support members may have any suitable configuration. It is especially preferred that the configuration of the support members and the configuration of the bottom surface indentations on the plant containers is such that plant containers can be placed on the support either in retention positions or not in retention positions, and when the containers are placed on the support otherwise than in retention positions the tray merely acts as a normal tray with the plant containers resting on the top surface of the support.

According to another aspect of the invention, there is provided a plant container including:

(a) a bottom surface;

(b) one or more holes in or near the bottom surface, enabling water from below to enter the container; and (c) indentations in the bottom surface for receiving and engaging with support members to provide the plant container with some stability against falling over.

Accordingly to another aspect of the invention, there is provided a support for plant containers, including an array of support members, each member being capable of cooperating and engaging with a complementary indentation in the bottom surface of a plant container when the plant container is in a retention position, to provide the plant container with some stability against falling over, the configuration of support members being such that they allow the bottom surface of a plant container to protrude or almost protrude below the support members when in a retention position, and further providing a plurality of retention positions, enabling variable spacing of plant containers on the support.

The invention will hereinafter be described in greater detail by reference to the attached drawings which show example forms of the invention. It is to be understood that the particularity of those drawings does not supersede the generality of the preceding description of the invention.

DETAILED DESCRIPTION OF THE PREFERRED EMBODIMENTS

The invention comprises a system for holding plant containers while allowing access to the bottoms of the plant containers for watering purposes. The system includes support 1 having an array of first support members 2, second support members 9 and third support members 10. The system further comprises a plurality of plant containers 3, each container having in its bottom surface 4 indentations 5 complementary to first support members 2, second support members 9 and third support members 10 of support.

Figure 1:
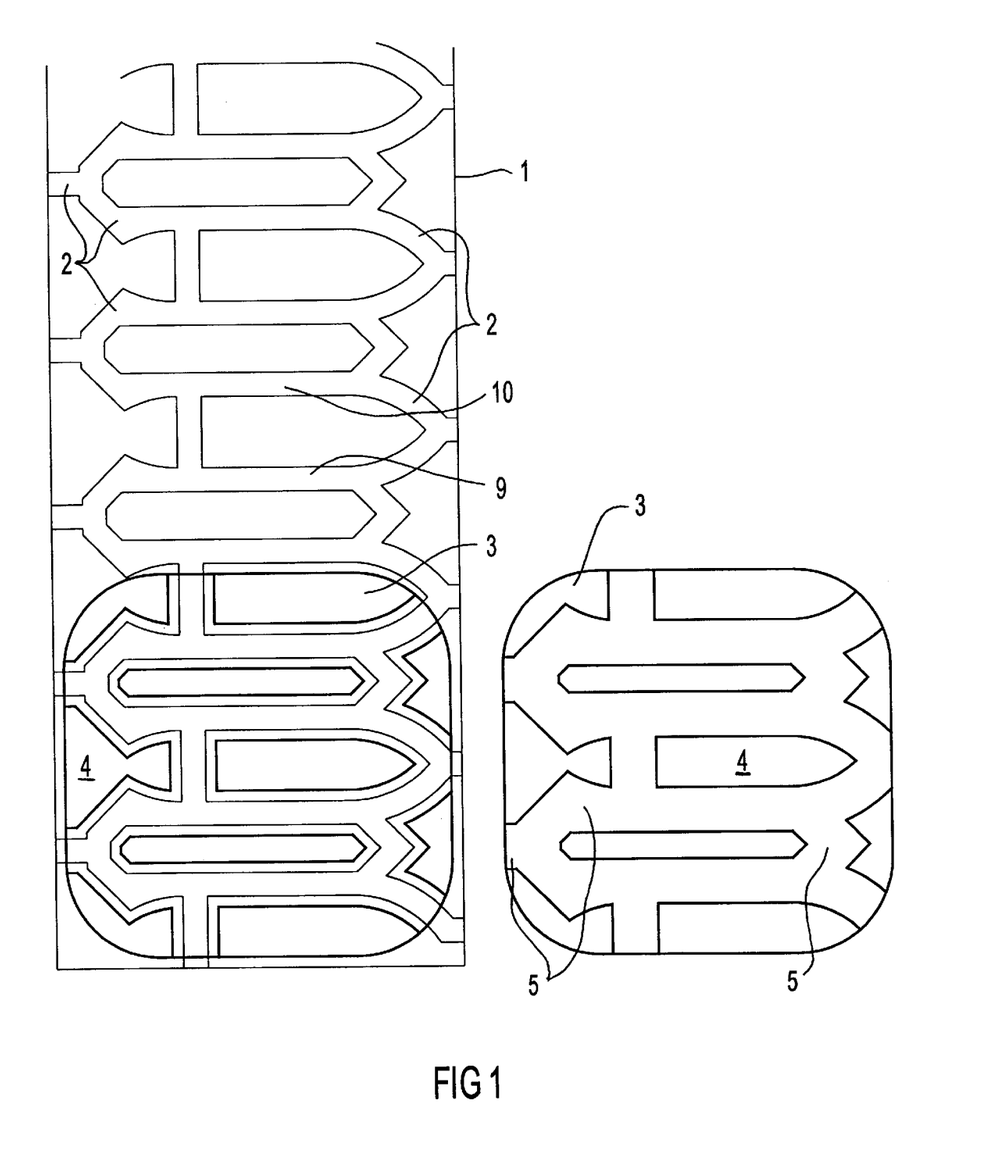
FIG. 1 is a schematic arrangement of a suitable form of support, shown cooperating with a complementary bottom surface of a plant container.

The configuration of support 1 and bottom surface indentations 5 on plant containers 3 is such that, when a plant container 3 is placed on support 1 in an appropriate orientation (herein described as a "retention position", and shown at the bottom left hand corner of FIG. 1), first support members 2, second support members 9 and third support members 10 engage with the container's bottom surface indentations 5 to provide the plant container with some stability against falling over.

The configuration of support 1 and bottom surface indentations 5 on plant containers 3 also provides that when a plant container is placed on support 1 in a retention position, the lowest parts of container 3 protrude below or almost below support members 2, enabling water from below support members 2, 9, and 10 to enter the plant container 3 through one or more holes 6 (not shown in FIG. 1, but shown in FIGS. 2 and 3) in or near bottom surface 4 of container 3. Moreover, support 1 provides a number of different retention positions for plant container 3, enabling the spacing between containers on support 1 to be varied.

As has previously been indicated, it is preferred that the number of retention positions be greater than the total number of containers which can be accommodated on the support at any one time. The embodiment illustrated shows a regular array of support members, with the spacing between support members being approximately one third the maximum width of plant container 3. As can be seen from comparing FIGS. 2 and 3, the maximum width in the plant container illustrated is given at top lip 7 of container 3. It will further be seen from FIG. 1 that, if a plant container is placed on support 1 in the position indicated. and another plant container is placed on the next adjacent available retention position, the area of support 1 between second support members 9 and third support members 10 will be free from the bottom surface of any container, although the top lips of the adjacent containers will be touching or almost touching. Each plant container effectively takes up three adjacent sets of support members.

Figure 7:
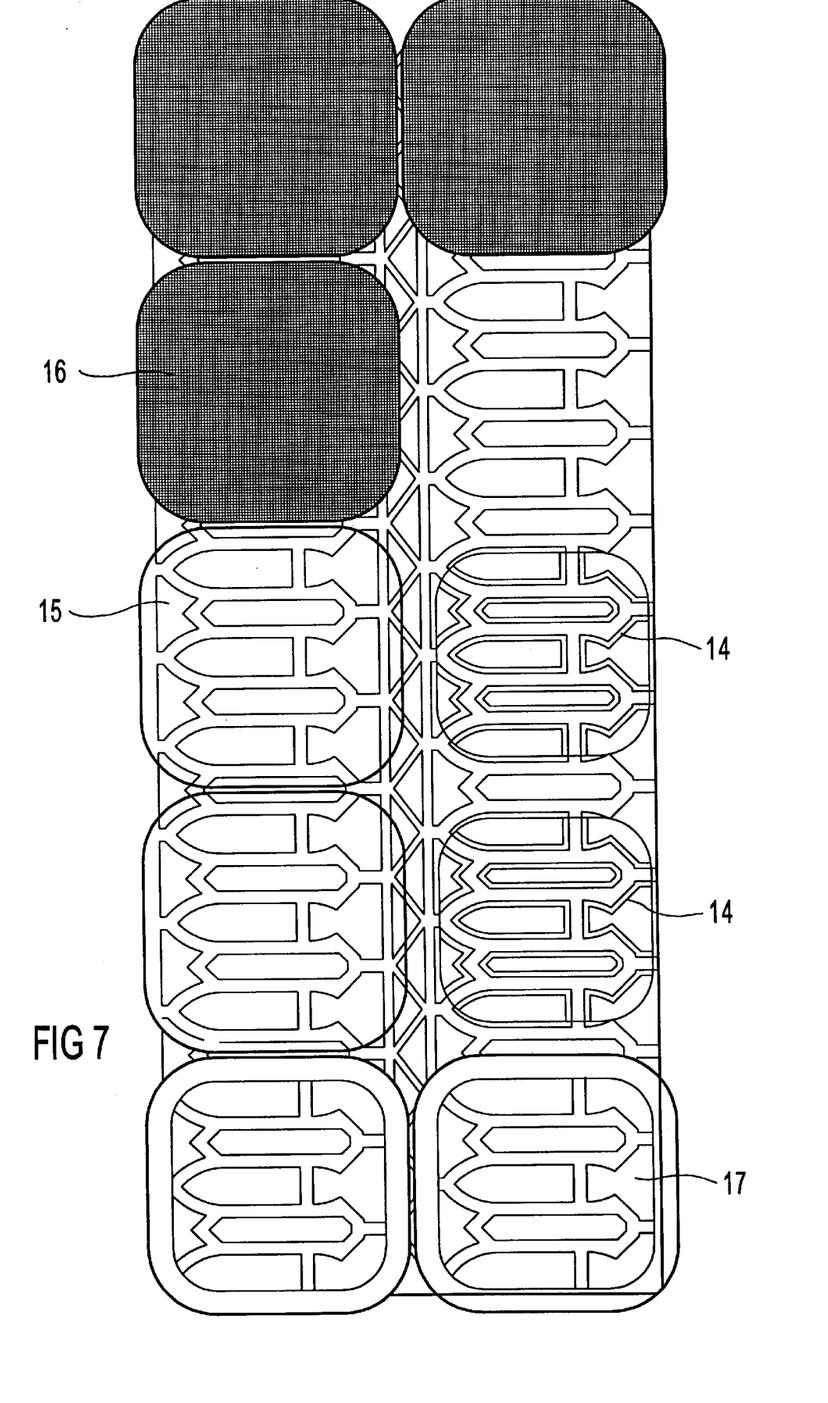
FIG. 7 is a top view of a support showing locations for tops and bottoms of plant containers.

This is shown in more detail in FIG. 7. On the right hand side of FIG. 7, the outlines 14 represent the area of the support covered by the bottoms of plant containers when in retention positions. On the left of FIG. 7, outline 15 represents the area covered by the top of a plant container, and shaded area 16 represents the total area covered by a plant container. Outlines 17 in the bottom right hand corner show comparative top and bottom outlines for a plant container.

Figure 8A:
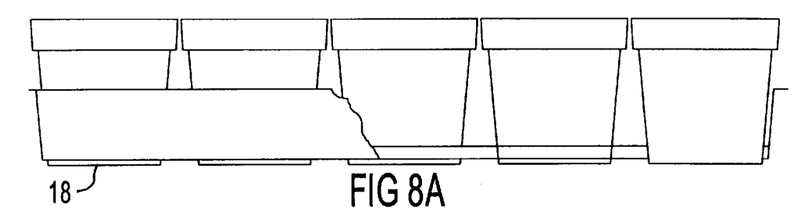
FIGS. 8A to 8H show various different configurations of plant containers on trays incorporating supports according to the invention.
Figure 8B:
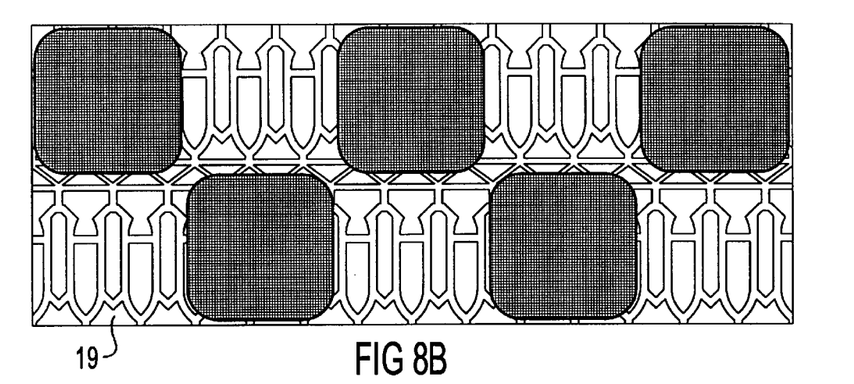
Figure 8C:
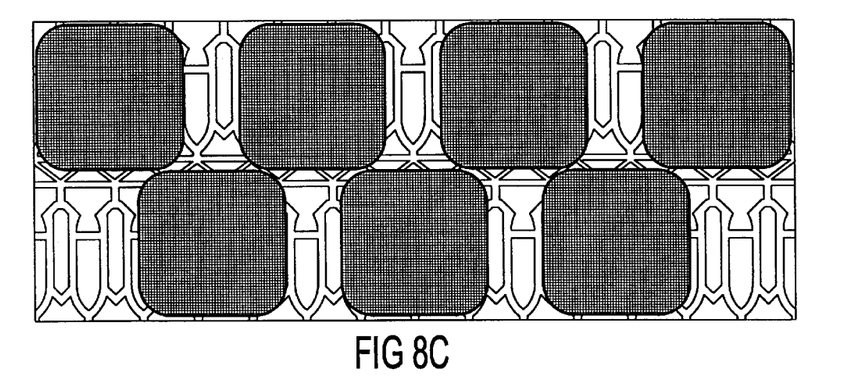
Figure 8D:
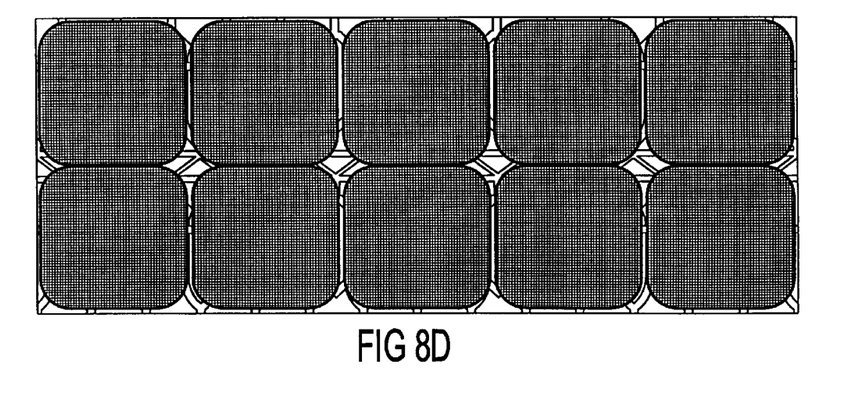
Figure 8E:
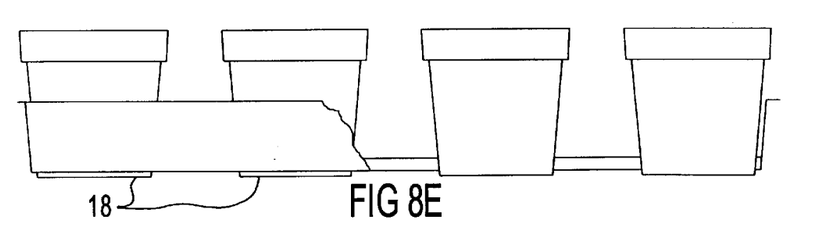
Figure 8F:
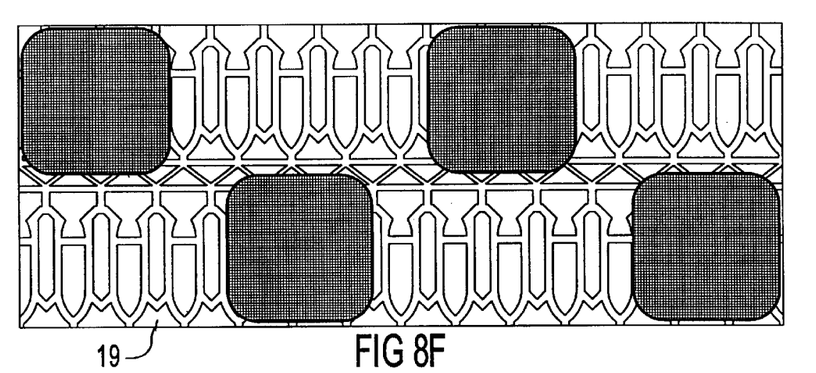
Figure 8G:
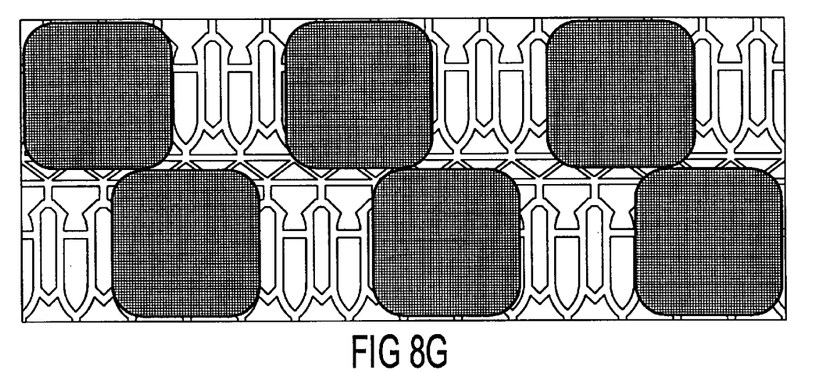
Figure 8H:
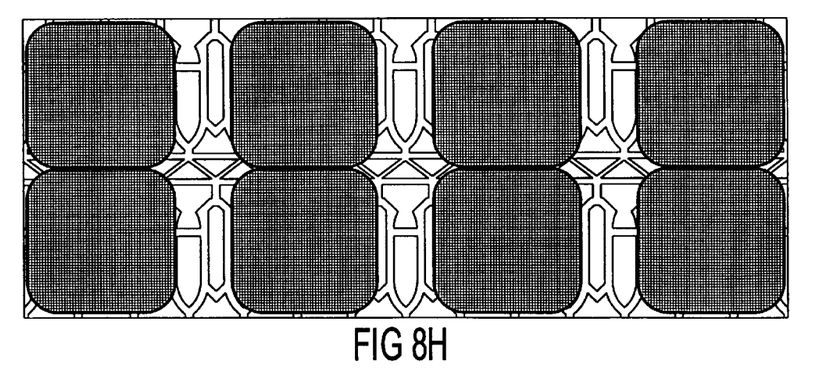

By moving adjacent plant containers along support 1 by one set of support members at a time, the spacing between adjacent plant containers can be increased by increments of one third of the maximum width of the plant container. This is best illustrated by FIGS. 8A to 8H. FIG. 8D shows a plant container tray 19 with ten plant containers side by side filling every available retention position. FIG. 8A shows a side view of this. FIG. 8B shows tray 19 with every second plant container removed, and with three sets of support members between adjacent containers. FIG. 8C shows the tray with a staggered arrangement, and inter-container spacing reduced to one third of a plant container width. FIG. 8F shows a staggered arrangement with spacing set to one-and-a-third plant container widths. FIG. 8G shows a staggered arrangement with two-thirds spacing. FIG. 8H shows a non-staggered arrangement with one-third spacing. FIG. 8E shows a side view of the arrangement of FIG. 8H.

The particular configuration of support members illustrated in FIG. 1 is essentially arbitrarily chosen. However, one advantage of the configuration is that there is only one orientation of plant container bottom 4 relative to a set of first support members 2, second support members 9 and third support members 10 in which plant container bottom 4 will locate a retention position. If plant container 3 is rotated from a retention position orientation about a vertical axis, no other retention position is located until the container has been rotated about 360°. If a plant container is placed on support 1 in any orientation other than a retention position orientation, support 1 functions as a normal tray, and the plant containers can be moved about on the tray at will (although, not being in retention positions, they are liable to fall over). This feature is not essential to the invention, but may be useful in providing versatility in display, particularly where a plant retailer does not utilise a watering system which provides water from below.

Figure 9A:
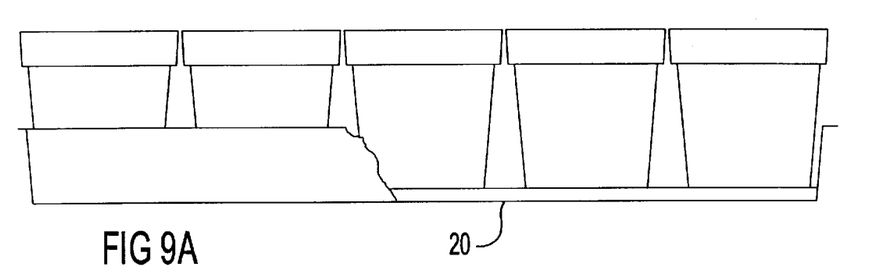
FIGS. 9A to 9C show broken side elevations of trays according to the invention in different configurations.
Figure 9B:
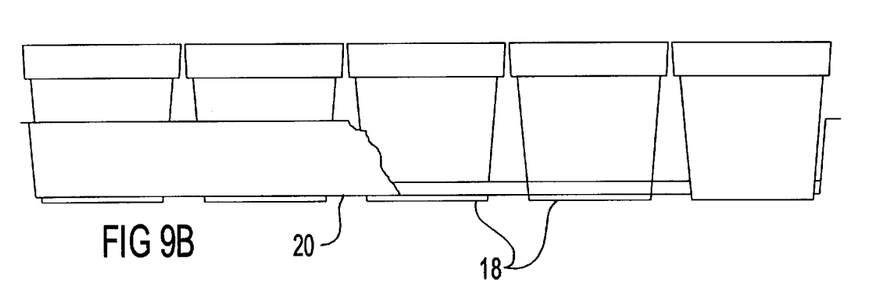

FIG. 9B illustrates a tray filled with plant containers, each in a retention position. Lowermost part 18 of each plant container protrudes below bottom 20 of the tray.

Figure 9C:
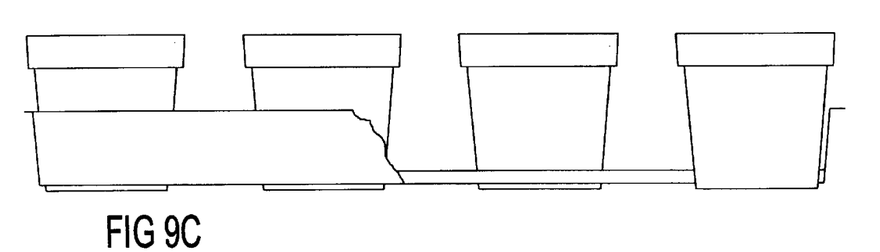

FIG. 9A shows the containers oriented on the tray in non-retention positions. No part of the containers protrudes below tray bottom 20, and the containers are free to move about as if on a normal flat-bottom tray. Of course, individual containers would be prone to falling over if spaced apart as shown in FIG. 9C without being in retention positions. (The containers in FIG. 9C are shown in retention positions.)

Figure 3:
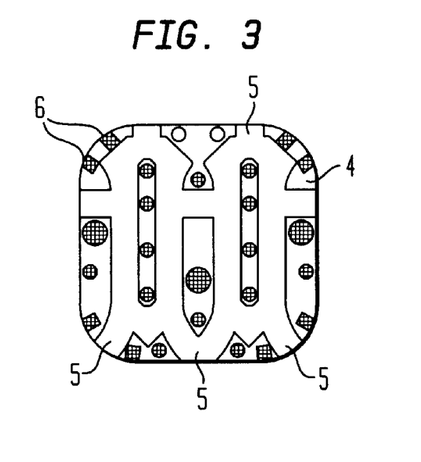
FIG. 3 is a bottom elevation of the plant container of FIG. 2.
Figure 4:
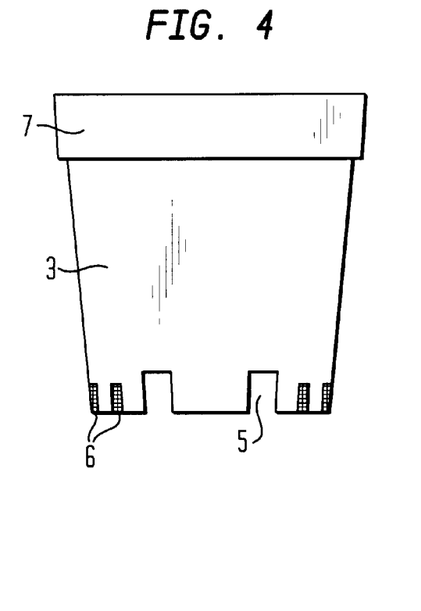
FIG. 4 is a side elevation of a plant container according to another embodiment of the invention.
Figure 5:
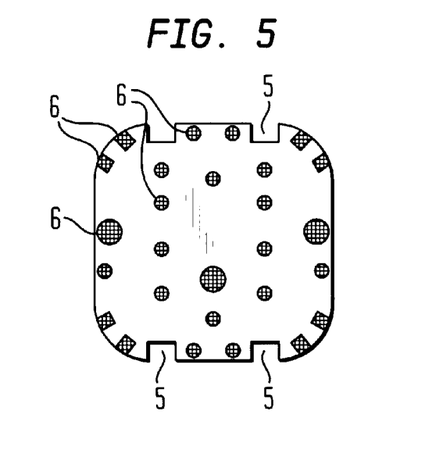
FIG. 5 is a bottom elevation of the plant container of FIG. 4.

An alternative embodiment of a plant container according to the invention is shown in FIGS. 4 and 5. In this embodiment, bottom surface indentations 5 are provided substantially symmetrically on plant container 3. A container in a retention position with this configuration has alternative retention positions when rotated through 90°, 180° and 270°. A support (not shown) for this embodiment of plant container need only have two projections on either side of the container, co-operating with the two bottom surface indentations on each side. However, in order to achieve the same resistance to falling over as is achieved by the embodiment of FIGS. 1 to 3, the indentations and co-operating support members need to be deeper. Moreover, this embodiment does not permit the flexibility of using the support as a normal tray when the plant containers are not in retention positions.

Figure 6:
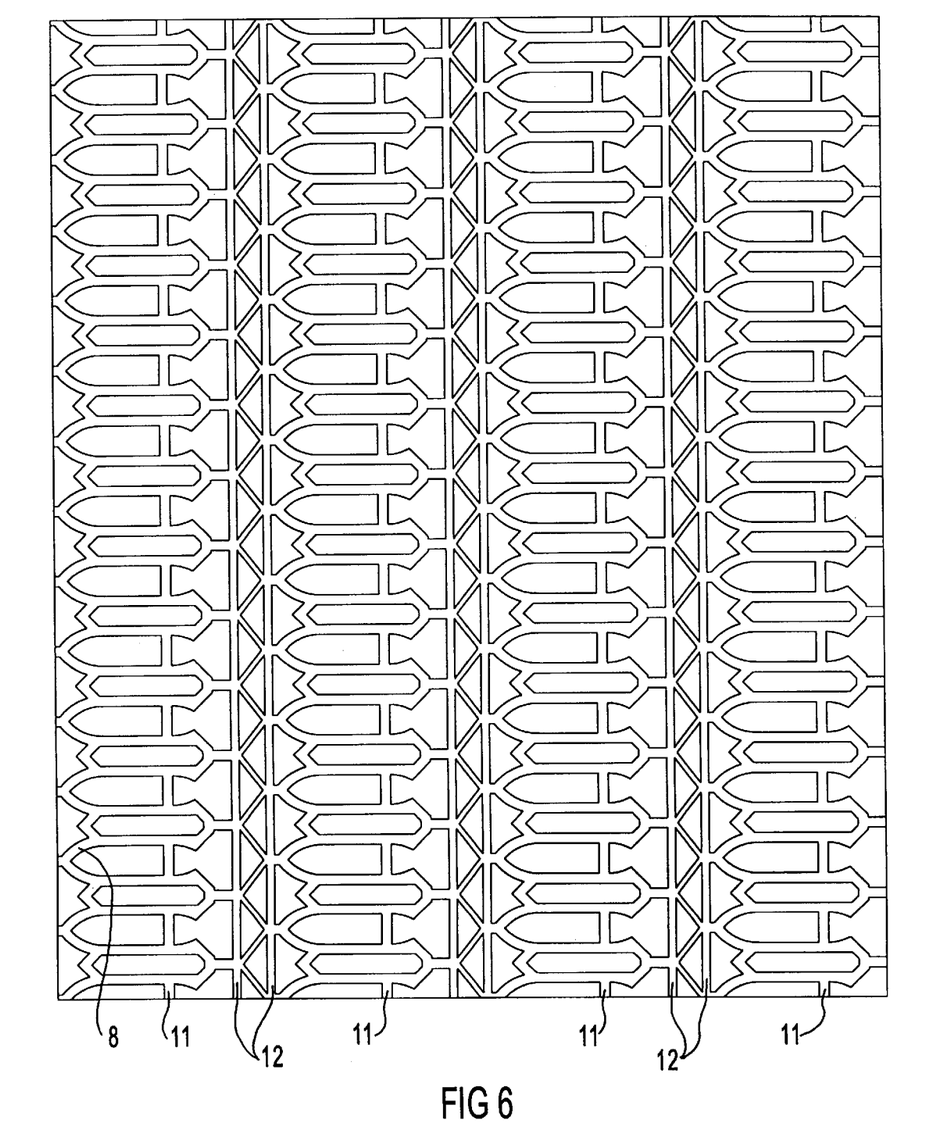
FIG. 6 shows an extended support suitable for a bench-top embodiment.

FIG. 6 shows a larger support 8, of a type suitable for covering a bench or a table. As illustrated, support 8 comprises a series of longitudinal rows of support members (the centre line of each being marked 11), held between separators 12. In practice, a bench can be covered with capillary matting, and the support can be laid on top of that. This is particularly suitable for automated plant growing and storage facilities, where plants are placed on benches which are moved into position on rails. Alternatively, supports can be laid directly across parallel arrays of capillary-matting-topped water conduits of the type described in my co-pending Australian provisional patent application PO 3891 entitled "Liquid supply apparatus and process" filed on Nov. 29, 1996. Benches and/or supports can of course be arranged in layers of different levels.

In one preferred arrangement, the maximum width of the plant containers is about 112 mm, and the spacing between sets of support members is about 37 mm. The depths of indentations in the bottom surfaces of the plant containers are about 9 to 10 mm, and the depth of the support members is about 8 mm. In this particular preferred embodiment, the support is open below the support members, so that the support may be placed on a water source such as capillary matting or a sand bed in such a way that the bottom surfaces of the plant containers are touching or almost touching the water source.

In another embodiment, a water source such as capillary matting may be provided as part of support 1, and a bottom surface may be provided underneath the capillary matting or other water source. It has been found that such a system works well in practice, but has the disadvantage that the capillary matting may retain moisture when the support is not in use, which may lead to hygiene difficulties.

The configuration illustrated in FIG. 1 has been found to produce a firm engagement between first support members 2, second support members 9 and third support members 10 and bottom surface indentations 5, thereby reducing the likelihood of a plant container falling over or being blown over. In designing a configuration for first support members 2, second support members 9 and third support members 10, it is desirable to provide a means of engagement which maximises resistance to falling over while at the same time keeping the depths of bottom surface indentations 5 and first support members 2, second support members 9 and third support members 10 relatively small, and also keeping it relatively easy to insert and remove plant containers from retention positions.

The support and the plant containers for use according to the invention can be manufactured from any suitable materials or combinations of materials. It has been found that moulded plastics are particularly suitable for both supports and plant containers. Other types of suitable materials include other types of plastics, mouldable metals and wood.

Figure 2:
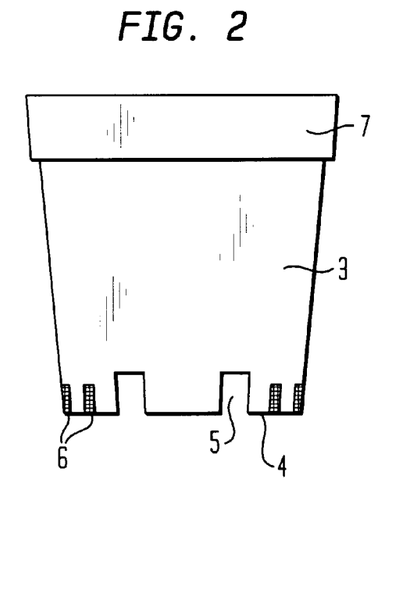
FIG. 2 is a side elevation of a plant container according to an embodiment of the invention.

The particular type of plant container illustrated in FIGS. 2 and 3 is an example only. It will be appreciated that the invention applies to plant containers of many different shapes and varieties including substantially rectangular plant and punnets, and hexagonal and octagonal containers. The particular relative height of the plant container does not affect the applicability of the invention.

It is to be understood that various alterations additions and/or modifications may be made to the parts previously described without departing from the ambit of the invention.

What is claimed is:

1. A system for holding plant containers for watering plants through the bottoms of the plant containers, including:

(a) a support having an array of support members; and (b) a plurality of plant containers, each container having a bottom surface with indentations complementary to support members of the support and one or more holes in or near the bottom surface;

(c) the support members and the indentations being sized and shaped to engage each other so that the support members support each container of the plurality of plant containers and provide each container with some stability against falling over;

(d) the indentations and support members being sized so that the bottom surface of the container protrudes below or almost below the support members when the support members and indentations are engaged with each other, enabling water from below the support members to enter each container through the one or more holes of each container; and (e) the support having a number of different retention positions for the plant containers, enabling the spacing between containers on the support to be varied.

2. A system according to claim 1 wherein the number of retention positions is greater than the total number of containers which can be accommodated simultaneously by the support.

3. A system according to claim 2 wherein the support members are spaced regularly with a separation of about one third of a lineal dimension of a typical plant container which is to be used with the support, so that the containers may be placed in the retention positions spaced from adjacent plant containers a multiple of about a third of a lineal dimension of the containers.

4. A system according to any one of claims 1 to 3 wherein the support members and the indentations of the plant containers are sized and shaped so that the plant containers are placed on the support in the retention positions when the support members and indentations engage each other and are supported on the support members by the bottom surface of the container when the support members and indentations are not engaged with each other.

* * * * *

UNITED STATES PATENT AND TRADEMARK OFFICE
CERTIFICATE OF CORRECTION

PATENT NO. : 6,085,460
DATED : July 11, 2000
INVENTOR(S) : Jackson

Page 1 of 1

It is certified that error appears in the above-identified patent and that said Letters Patent is hereby corrected as shown below:

Title page, item [57] Abstract,
Line 7, after "support" (second occurrence) insert -- . --.

Column 6,
Line 39, after "alterations" insert -- , --.
Line 39, after "additions" insert -- , --.

Signed and Sealed this

Eighteenth Day of September, 2001

Attest:

NICHOLAS P. GODICI
Attesting Officer
Acting Director of the United States Patent and Trademark Office